(12) United States Patent  (10) Patent No.: US 8,009,210 B2
Matsushima  (45) Date of Patent: Aug. 30, 2011

(54) IMAGE PROCESSING CIRCUIT, IMAGING APPARATUS, METHOD AND PROGRAM

(75) Inventor: Kazuyuki Matsushima, Kanagawa (JP)

(73) Assignee: Sony Corporation, Tokyo (JP)

( * ) Notice: Subject to any disclaimer, the term of this patent is extended or adjusted under 35 U.S.C. 154(b) by 492 days.

(21) Appl. No.: 12/289,365

(22) Filed: Oct. 27, 2008

(65) Prior Publication Data

US 2009/0167904 A1  Jul. 2, 2009

(30) Foreign Application Priority Data

Dec. 26, 2007  (JP) .................................. 2007-335079

(51) Int. Cl.
*H04N 9/64* (2006.01)
*H04N 5/217* (2006.01)
*G06K 9/40* (2006.01)
(52) U.S. Cl. .......................... 348/247; 348/241; 382/275
(58) Field of Classification Search ........... 348/246–247
See application file for complete search history.

(56) References Cited

U.S. PATENT DOCUMENTS

| 6,343,146 | B1 * | 1/2002 | Tsuruoka et al. | 382/163 |
| 7,397,973 | B2 * | 7/2008 | Lee | 382/300 |
| 7,564,491 | B2 * | 7/2009 | Yoneda et al. | 348/246 |
| 2002/0101525 | A1 * | 8/2002 | Abe | 348/273 |
| 2003/0077001 | A1 * | 4/2003 | Yamashita et al. | 382/276 |
| 2004/0135926 | A1 * | 7/2004 | Song et al. | 348/448 |
| 2005/0220337 | A1 * | 10/2005 | Arazaki | 382/162 |

FOREIGN PATENT DOCUMENTS

JP  02-174469  7/1990

* cited by examiner

*Primary Examiner* — Kelly L Jerabek
(74) *Attorney, Agent, or Firm* — Rader, Fishman & Grauer PLLC

(57) ABSTRACT

An image processing circuit includes a plurality of memories for storing line pixels of a frame constituting an image, a specific pixel detecting unit for obtaining a luminance difference value, detecting a first minimum pixel (1), detecting a second minimum pixel (1), and detecting a second minimum pixel (2) and a pixel interpolating unit for applying filter coefficients to the observation pixel and specific pixels, obtaining a total sum of results of applying each filter coefficient to each pixel, and dividing the total sum by a total sum of filter coefficients of N×N pixels to obtain an interpolated value for the observation pixel.

7 Claims, 17 Drawing Sheets

FIG. 4
31 —  : OBSERVATION PIXEL (CENTER PIXEL)
32 —  : PIXEL min1_3x3
(PIXEL HAVING MINIMUM LUMINANCE DIFFERENCE AMONG 3 x 3 PIXELS)
33 —  : PIXEL min2_3x3
(MINMUM PIXEL AMONG 3 PIXELS OPPOSITE TO min1_3x3)
34 —  : PIXEL min1_5x5
(ADJACENT MINIMUM PIXEL ONE PIXEL OUTSIDE min1_3x3)
35 —  : PIXEL min2_5x5
(ADJACENT MINIMUM PIXEL ONE PIXEL OUTSIDE min2_3x3)

BIT SHIFT METHOD

FUNCTION METHOD

FIG. 11A

| 8  | 16 | 32  | 16 | 8  |
|----|----|-----|----|----|
| 16 | 32 | 64  | 32 | 16 |
| 32 | 64 | 128 | 64 | 32 |
| 16 | 32 | 64  | 32 | 16 |
| 8  | 16 | 32  | 16 | 8  |

FIG. 11B

| 1 | 4  | 6  | 4  | 1 |
|---|----|----|----|---|
| 4 | 16 | 24 | 16 | 4 |
| 6 | 24 | 36 | 24 | 6 |
| 4 | 16 | 24 | 16 | 4 |
| 1 | 4  | 6  | 4  | 1 |

FIG. 12A

| 50 | 50 | 50  | 50 | 50 |
|----|----|-----|----|----|
| 50 | 50 | 50  | 50 | 50 |
| 50 | 50 | 255 | 50 | 50 |
| 50 | 50 | 50  | 50 | 50 |
| 50 | 50 | 50  | 50 | 50 |

FIG. 12B

| 128 | 0   | 0   | 0   | 0   |
|-----|-----|-----|-----|-----|
| 0   | 128 | 0   | 0   | 128 |
| 0   | 0   | 128 | 128 | 0   |
| 0   | 0   | 0   | 0   | 0   |
| 0   | 0   | 0   | 0   | 0   |

FIG. 13A
| 255 | 255 | 50 | 50 | 50 |
| 255 | 255 | 50 | 50 | 50 |
| 255 | 254 | 50 | 49 | 50 |
| 255 | 255 | 50 | 50 | 50 |
| 255 | 255 | 50 | 50 | 50 |
FIG. 13B
| 0 | 0 | 32 | 16 | 8 |
| 128 | 0 | 64 | 32 | 16 |
| 0 | 128 | 128 | 64 | 32 |
| 0 | 0 | 64 | 32 | 16 |
| 0 | 0 | 32 | 16 | 8 |
FIG. 14A
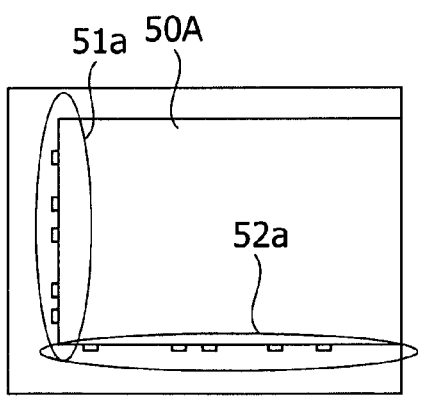
NOT APPLYING ON-BORDER
ERRONEOUS INTERPOLATION
REMOVING PROCESS
FIG. 14B
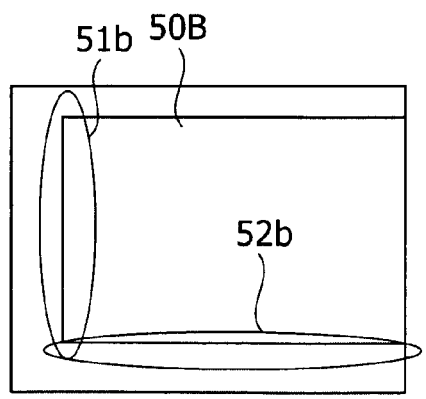
APPLYING ON-BORDER
ERRONEOUS INTERPOLATION
REMOVING PROCESS

FIG. 16

| PIXEL COLOR | | PIXEL MEANING | WEIGHTING COEFFICIENT |
|---|---|---|---|
| 71 | ▦ | SPECIFIC PIXEL DETECTION (EDGE COMPONENTS) | SAME VALUE AS OBSERVATION PIXEL FILTER COEFFICIENT |
| 72 | ☰ | PIXELS HAVING LUMINANCE DIFFERENCE VALUES OF 0 TO 10 FROM OBSERVATION PIXEL | ×1 |
| 73 | ⫼ | PIXELS HAVING LUMINANCE DIFFERENCE VALUES OF 0 TO 20 FROM OBSERVATION PIXEL | >>1 (×1/2) |
| 74 | ▨ | PIXELS HAVING LUMINANCE DIFFERENCE VALUES OF 0 TO 30 FROM OBSERVATION PIXEL | >>2 (×1/4) |
| 75 | ▨ | PIXELS HAVING LUMINANCE DIFFERENCE VALUES OF 0 TO 40 FROM OBSERVATION PIXEL | >>3 (×1/8) |
| 76 | ▩ | PIXELS HAVING LUMINANCE DIFFERENCE VALUES OF 40 AND LARGER FROM OBSERVATION PIXEL | >>4 (×1/16) |

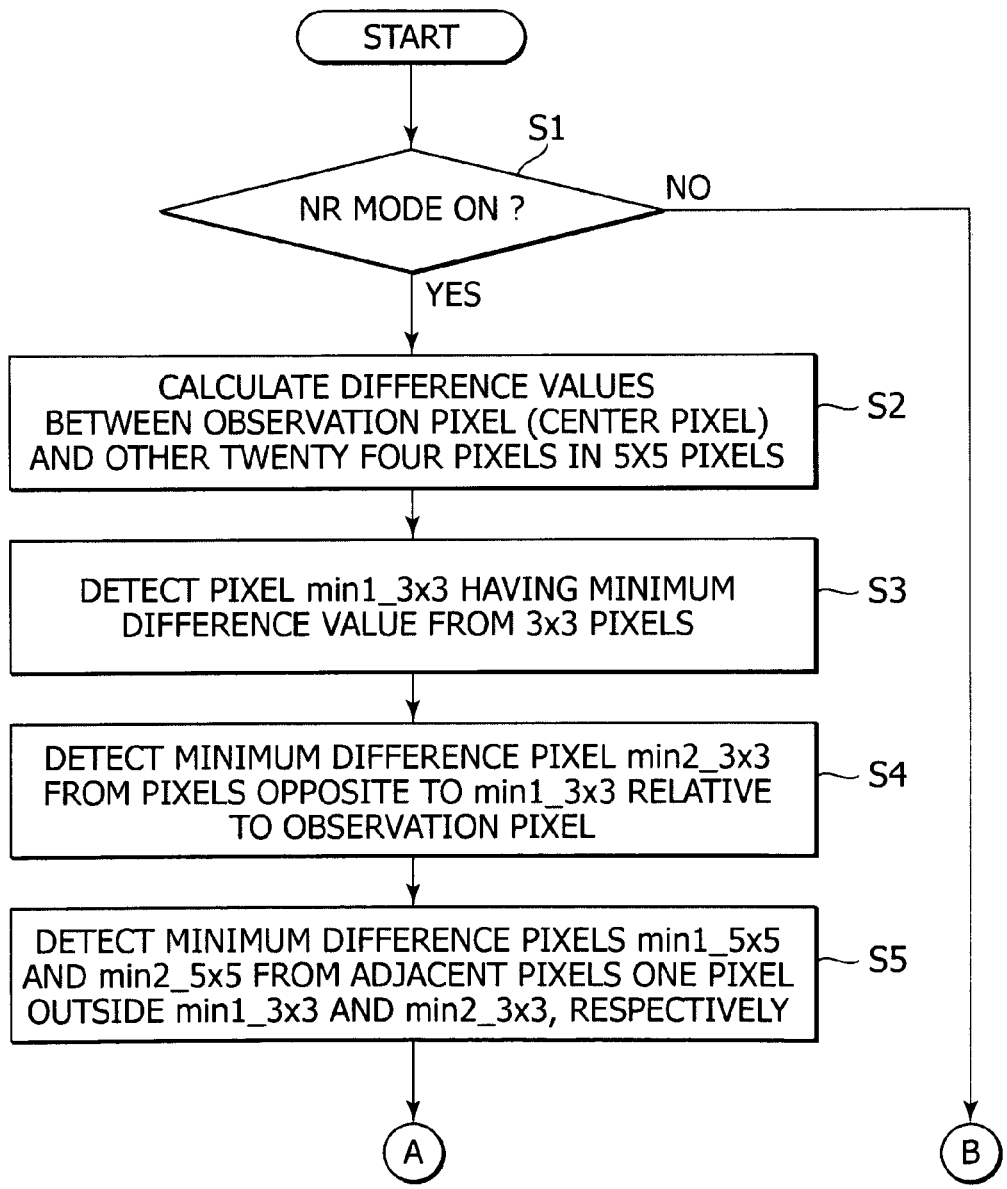

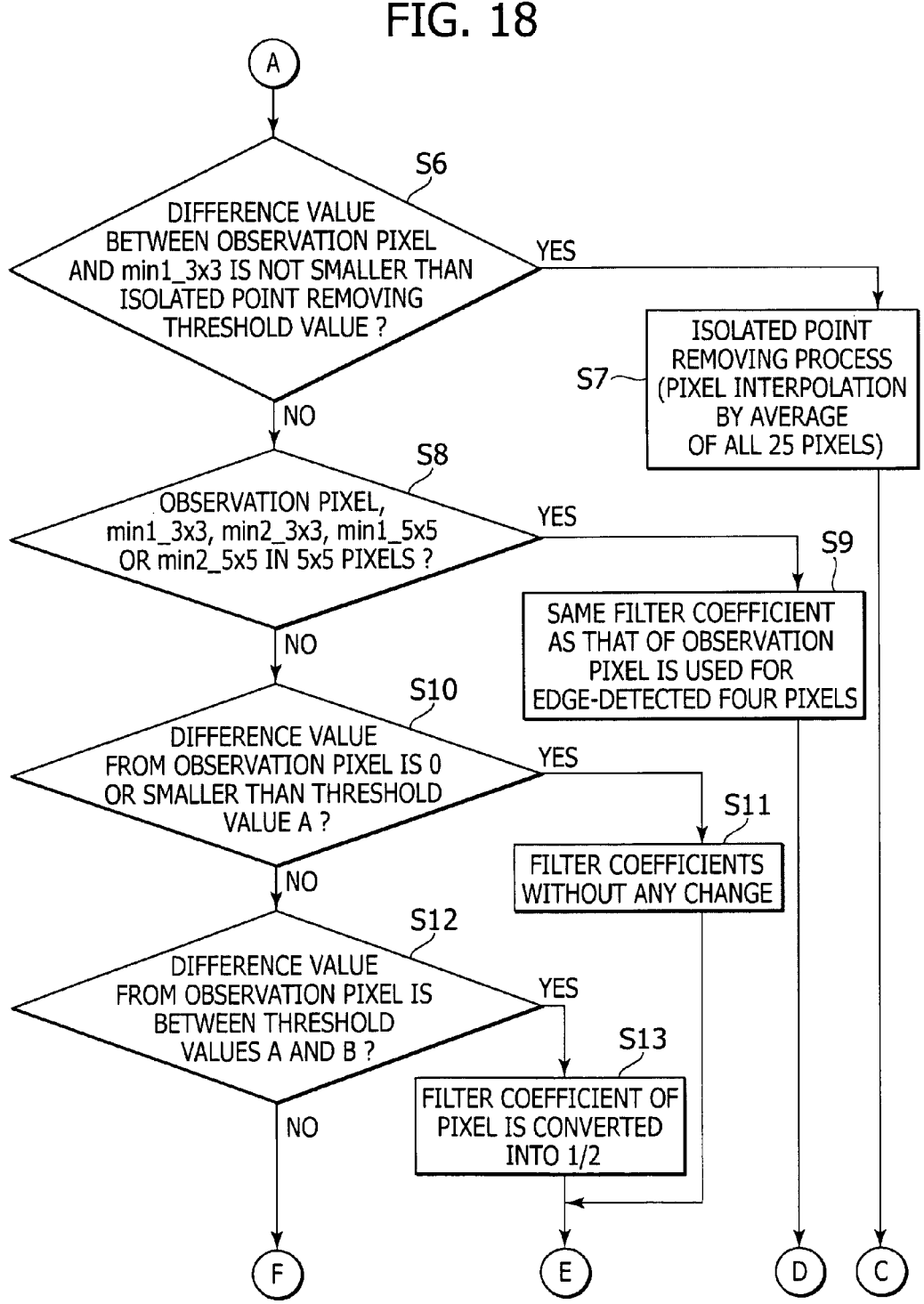

IMAGE PROCESSING CIRCUIT, IMAGING APPARATUS, METHOD AND PROGRAM

BACKGROUND OF THE INVENTION

1. Field of the Invention

The present invention relates to an image processing circuit, an imaging apparatus, a method and a program suitable for use in removing noises contained in an image.

2. Description of Related Art

In a related art camera devices, such as a digital still camera (DSC), a mobile phone with a built-in camera, a camcorder and a monitor camera, it is general to photograph a low luminance area by amplifying signal components by performing signal processing such as automatic gain control (AGC) in order to allow even a dark area to be photographed. In this case, not only signal components but also noise components are amplified, and accordingly a photographed image becomes an image having many noises as compared to a real image and being bored by a feeling of strangeness.

To solve the issue, a method has been proposed which removes noise components by calculating signal differences along a time axis direction by using a frame memory or the like (e.g., refer to Japanese Patent Unexamined Publication No. HEI-02-174469, Patent Document 1).

SUMMARY OF THE INVENTION

The techniques disclosed in Patent Document 1 is, however, associated with an issue that an afterimage of an object in motion (hereinafter called a "moving object") is formed as the higher a level of a noise removing function is set.

There is a Gaussian filter as a typical filter used for noise removal not in a time axis direction but in a frequency axis direction. As different from the time axis direction, noise removal in the frequency axis direction does not form an afterimage of a moving object, but there is an issue that edge components are blurred and resolution feeling is degraded.

Similarly, there is a bilateral filter which is used as a filter for noise removal in the frequency axis direction. If the bilateral filter is used, although noises can be removed while detecting edge components, there is an issue that a circuit scale becomes large because an exponential function is used for calculations.

There is also a direction dependent type filter for detecting edges in a simple manner as a filter for noise removal in the frequency axis direction. If the direction dependent type filter is used, although the circuit scale does not become large, there arises an issue that there are only 8 detectable edges, and noises cannot be removed for an object having a complicated pattern (edge components).

The present invention is made in consideration of the above-described circumstances, and can remove noises of an image without forming an afterimage of a moving object while retaining resolution feeling.

An image processing circuit according to one aspect of the present invention includes a plurality of memories for storing line pixels of a frame constituting an image, a specific pixel detecting unit for obtaining, for pixels of an arbitrary N×N (N is a natural number) array of the frame of the image sequentially read from the plurality of memories, a luminance difference value which is a difference value of luminance between an observation pixel positioned at a center of the array and each of other (N×N−1) pixels, detecting a first minimum pixel (1) having a minimum luminance difference value among a plurality of pixels adjacent to the observation pixel, detecting a first minimum pixel (2) having a minimum luminance difference value from the observation pixel among three pixels opposite to the first minimum pixel (1) which sandwich the observation pixel, detecting a second minimum pixel (1) having a minimum luminance difference value from the observation pixel among adjacent pixels on an outside of one pixel with respect to the first minimum pixel (1), and detecting a second minimum pixel (2) having a minimum luminance difference value from the observation pixel among adjacent pixels on an outside of one pixel with respect to the first minimum pixel (2), and a pixel interpolating unit for applying filter coefficients having predetermined weights to the observation pixel and specific pixels including the first minimum pixel (1), the first minimum pixel (2), the second minimum pixel (1) and the second minimum pixel (2) which are detected at the specific pixel detecting unit, applying filter coefficients having weights corresponding to the luminance difference value and a distance from the observation pixel to pixels other than the specific pixels in the N×N pixels, obtaining a total sum of results of applying each filter coefficient to each pixel, and dividing the total sum by a total sum of filter coefficients of N×N pixels to obtain an interpolated value for the observation pixel.

An imaging apparatus according to one aspect of the present invention includes an imaging unit for photographing an object and generating an image, a plurality of memories for storing line pixels of a frame constituting the image generated by the imaging unit, a specific pixel detecting unit for obtaining, for pixels of an arbitrary N×N (N is a natural number) array of the frame of the image sequentially read from the plurality of memories, a luminance difference value which is a difference value of luminance between an observation pixel positioned at a center of the array and each of other (N×N−1) pixels, detecting a first minimum pixel (1) having a minimum luminance difference value among a plurality of pixels adjacent to the observation pixel, detecting a first minimum pixel (2) having a minimum luminance difference value from the observation pixel among three pixels opposite to the first minimum pixel (1) by sandwiching the observation pixel, detecting a second minimum pixel (1) having a minimum luminance difference value from the observation pixel among adjacent pixels on an outside of one pixel with respect to the first minimum pixel (1), and detecting a second minimum pixel (2) having a minimum luminance difference value from the observation pixel among adjacent pixels on a side one pixel outside the first minimum pixel (2), and a pixel interpolating unit for applying filter coefficients having predetermined weights to the observation pixel and specific pixels including the first minimum pixel (1), the first minimum pixel (2), the second minimum pixel (1) and the second minimum pixel (2) which are detected at the specific pixel detecting unit, applying filter coefficients having weights corresponding to the luminance difference value and a distance from the observation pixel to pixels other than the specific pixels in the N×N pixels, obtaining a total sum of results of applying each filter coefficient to each pixel, and dividing the total sum by a total sum of filter coefficients of N×N pixels to obtain an interpolated value for the observation pixel.

An image processing method and a program according to one aspect of the present invention includes steps of: for pixels of an arbitrary N×N (N is a natural number) array of the frame of the image, obtaining a luminance difference value which is a difference value of luminance between an observation pixel positioned at a center of the array and each of other (N×N−1) pixels, detecting a first minimum pixel (1) having a minimum luminance difference value among a plurality of pixels adjacent to the observation pixel, detecting a first minimum pixel (2) having a minimum luminance difference value from the observation pixel among three pixels opposite to the first minimum pixel (1) by sandwiching the observation pixel, detecting a second minimum pixel (1) having a minimum luminance difference value from the observation pixel among adjacent pixels on a side one pixel outside the first minimum pixel (1), detecting a second minimum pixel (2) having a minimum luminance difference value from the observation pixel among adjacent pixels on a side one pixel outside the first minimum pixel (2), applying filter coefficients having predetermined weights to the observation pixel and specific pixels including the first minimum pixel (1), the first minimum pixel (2), the second minimum pixel (1) and the second minimum pixel (2), and applying filter coefficients having weights corresponding to the luminance difference value and a distance from the observation pixel to pixels other than the specific pixels in the N×N pixels, and obtaining a total sum of results of applying each filter coefficient to each pixel, and dividing the total sum by a total sum of filter coefficients of N×N pixels to obtain an interpolation values According to one aspect of the present invention, the specific pixels as edge components can be detected adaptively outward from the center pixel. It is also possible to configure a filter adaptively by considering edge components in accordance with the detected specific pixels.

As above, according to one aspect of the present invention, it becomes possible to remove noises of an image without forming an afterimage of a moving object while retaining resolution feeling.

BRIEF DESCRIPTION OF THE DRAWINGS

FIG. 4 is an illustrative diagram showing legends to be used for explaining a specific pixel detecting process;

FIGS. 11A and 11B are diagrams showing examples (before change) of a weighting filter relative to a distance from the center pixel, FIG. 11A shows a weighting filter (1) and FIG. 11B shows a Gaussian filter;

FIGS. 12A and 12B show examples of pixels to be used for explaining an isolated point detecting/removing process, FIG. 12A shows an example of an image containing an isolated point, and FIG. 12B shows an example of edge pixels not applying isolated point detecting/removing;

FIGS. 13A and 13B show examples of pixels to be used for explaining an on-border erroneous interpolation removing process, FIG. 13A shows an example of a border and FIG. 13B shows an example not applying the on-border erroneous interpolation removing process;

FIGS. 14A and 14B shows examples of an image to be used for explaining the on-border erroneous interpolation removing process, FIG. 14A shows an example without the on-border erroneous interpolation removing process and FIG. 14B shows an example with the on-border erroneous interpolation removing process;

FIG. 16 is a diagram showing legends of pixels used in FIG. 15;

FIG. 17 is a flow chart (1) showing an example of processes by a noise removing circuit (NR);

FIG. 18 is a flow chart (2) showing an example of processes by the noise removing circuit (NR);

DETAILED DESCRIPTION OF THE EMBODIMENTS

Embodiments of the present invention will now be described hereunder with reference to the accompanying drawings.

The embodiments to be described hereunder are specific examples of preferred embodiments for implementing the present invention, therefore various technically preferred limitations are added thereto. However, the present invention is not limited to these embodiments unless there is description of limiting the present invention in the description of the embodiments. Therefore, for example, materials and their quantities used in the following description, a process time, a process order, a numerical condition of each parameter, and the like are only preferable examples, and further the size, shape, layout and the like in each drawing used for explanation are illustrative and schematic.

Figure 1:
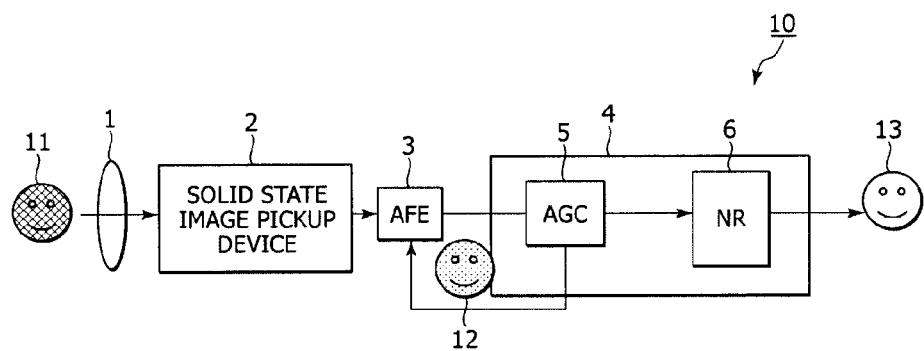
FIG. 1 is a block diagram showing an example of the structure of a digital camera system according to an embodiment of the present invention.

FIG. 1 is a block diagram showing an embodiment of a system to which the present invention is applied.

Although description will be made assuming that a digital still camera is used as the system of the embodiment, the system is not limited thereto, but the present invention is also applicable to other camera devices such as a mobile phone with a built-in camera, a camcorder and a monitor camera.

A digital still camera 10 is structured including an optical system such as a lens 1, a solid state image pickup device 2, an analog front end (AFE) 3 and an image processing unit 4.

The optical system such as the lens 1 and the solid state image pickup device 2 constitute a camera module together with an iris, a shutter and the like (not shown). In the example shown in FIG. 1, although this camera module is structured integrally with the digital still camera 10, it may be structured detachably. An imaging unit described in the claims is intended to include at least an image sensor.

The solid state image pickup device 2 is one example of the image sensor, but is not limited thereto, and a complementary metal oxide semiconductor (CMOS) or the like may also be used.

In the digital still camera 10, incident light from an object 11 passed through the optical system such as the lens 1 arrives first at each photoreceptor on an imaging plane of the solid state image pickup device 2, and is converted into an electrical signal by photoelectric conversion by each photoreceptor. The electrical signal output from the solid state image pickup device 2 is input to an analog front end (AFE) 3.

AFE 3 is an analog processing circuit for performing analog/digital conversion to convert an input analog electrical signal into a digital electrical signal (image data). After digitalization through analog/digital conversion, the signal is output from AFE 3 to the image processing unit 4 as an image data. Alternatively, after the image data is stored temporarily in a video memory (not shown), the image data may be output to the image processing unit 4.

An analog/digital conversion function of AFE 3 converts an input electrical signal into image data having the number of tonal levels of a general digital still camera (e.g., the number of tonal levels capable of being expressed by data of about 10 to 12 bits) or the number of tonal levels larger than the first-mentioned number (e.g., the number of tonal levels capable of being expressed by data of about 14 to 16 bits). AFE 3 may have a correlation double sampling circuit (not shown) to allow AFE to execute a predetermined sampling process for obtaining a correlation of an object signal.

The image processing unit 4 is structured by including an AGC 5 for performing automatic gain control and a noise removing circuit (hereinafter described as "NR") 6. AGC 5 controls a signal level of image data input from AFE 3 to an optimum level, and further NR 6 removes noises of the image data to generate image data 13. A processed result by AGC 5 is sent to AFE 3 as necessary.

For example, if an object in a low illumination area is photographed with the digital still camera 10, the process by AGC 5 and the like raise the signal level of not only signal components but also noise components so that image data 12 is generated in which noises is caused in a photographed scene.

By installing a noise removal processing function of NR 6 proposed in the present specification in the NR block of the image processing unit 4, it becomes possible to remove noises of this type without forming an afterimage of a moving object, while retaining resolution feeling.

The image processing unit 4 is a block constituted of, e.g., a signal processing processor (e.g., digital signal processor: DSP), and a memory such as a random access memory (not shown) for holding image data, and the like, and image processing to be described later may be performed by making the processor execute a predetermined program.

The digital still camera 10 has a controller (not shown) constituted of a processor and a memory, and the operation of each block is controlled in accordance with a command from the controller.

Figure 2:
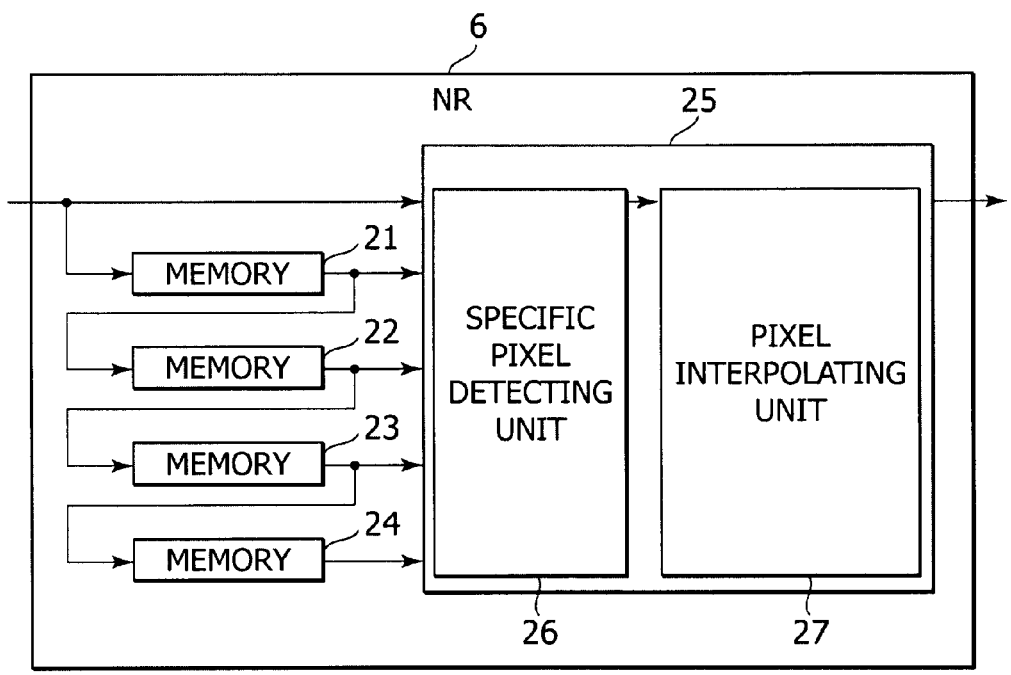
FIG. 2 is a block diagram showing an example of the internal structure of an NR block shown in FIG. 1.

FIG. 2 is a block diagram showing an example of the internal structure of the NR block.

NR 6 of the image processing unit 4 is structured being equipped with four memories 21 to 24 and a calculation block 25 including a specific pixel detecting unit 26 and a pixel interpolating unit 27.

NR 6 has the memories 21 to 24 each having a line memory function such as shown in FIG. 2 (in this example, although four memories are used, more or less memories may be used), and image data of a photographed scene is stored properly in the memories 21 to 24 per each line constituting a frame.

The specific pixel detecting unit 26 of the calculation block 25 uses image signals corresponding in number to those input from AFE 3 and each image signal (four signals in total) stored in the memories 21 to 24 to detect edge components passing through an observation pixel (center pixel) to be described later, based on a luminance difference from the center pixel. Information including the detected edge components is sent to the pixel interpolating unit 27.

The pixel interpolating unit 27 adds a specific filter coefficient (weighting coefficient) to the edge components detected by the specific pixel detecting unit 26, adds a filter coefficient (weighting coefficient) corresponding to a luminance difference from and a distance from the center pixel to pixels of ones which are not detected as a edge component, and performs calculations to obtain a pixel interpolating value of the observation pixel (center pixel).

<Specific Pixel Detecting Method>

Next, with reference to FIGS. 3 to 9, description will be made on a specific pixel detecting method by the specific pixel detecting unit 26.

In the following example, description will be made on detecting an edge component pixel by using a 5×5 pixel array in a certain area of an image (frame). In this example, although description will be made by using a 5×5 pixel array, similar processing may also be performed even for an N×N (N is a natural number) pixel array by changing the number of memories.

Figure 3:
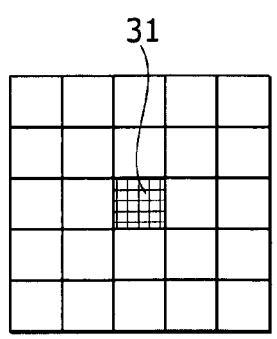
FIG. 3 is a diagram showing an example of a pixel array of 5×5.
Figure 5A:
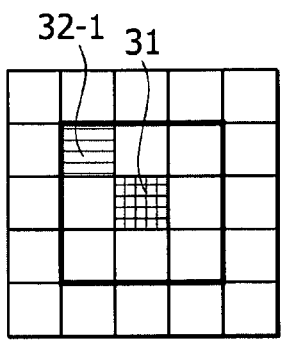
FIGS. 5A to 5H are diagrams showing examples of a pixel min1_3×3.
Figure 5B:
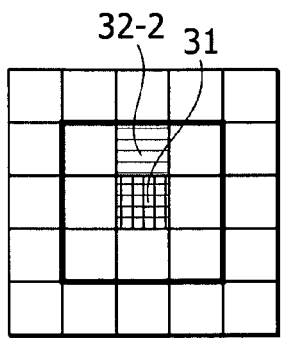
Figure 5C:
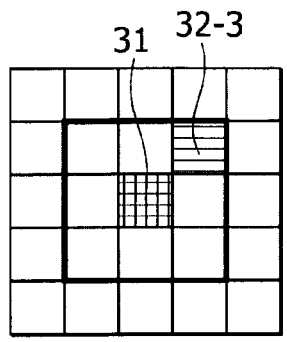
Figure 5H:
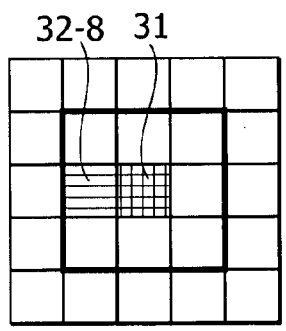
Figure 5D:
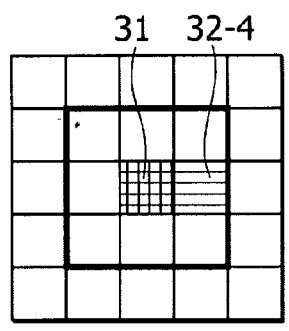
Figure 5G:
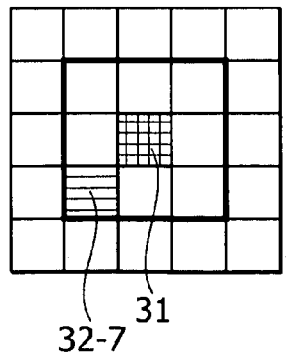
Figure 5F:
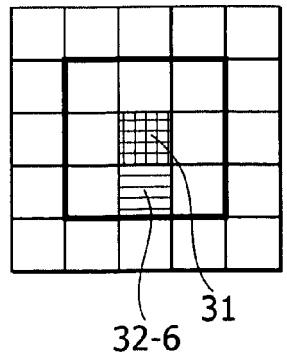
Figure 5E:
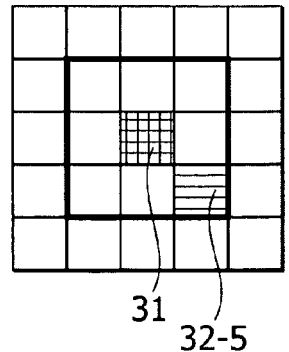
Figure 6A:
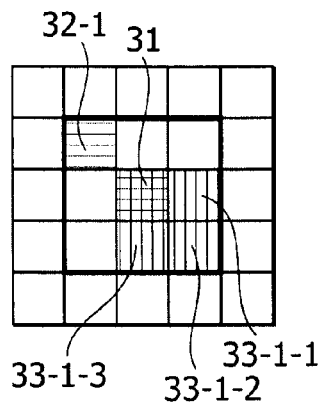
FIGS. 6A to 6H are diagrams showing examples of a pixel min2_3×3.
Figure 6B:
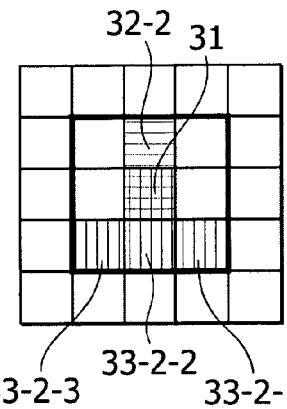
Figure 6C:
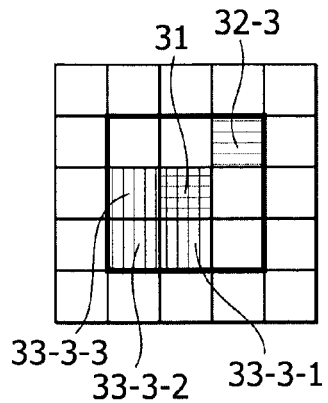
Figure 6H:
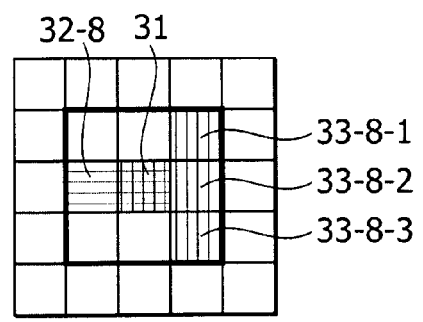
Figure 6D:
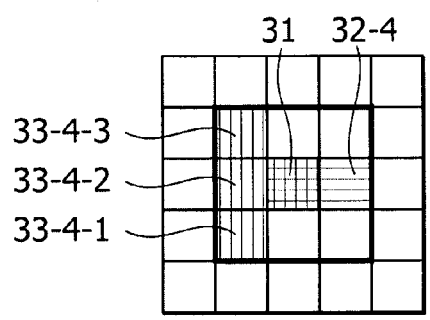
Figure 6G:
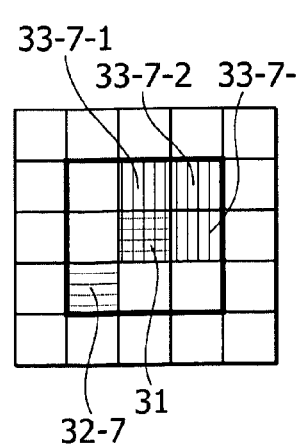
Figure 6F:
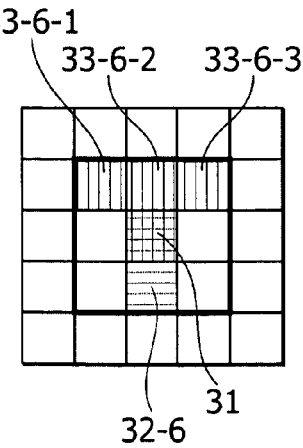
Figure 6E:
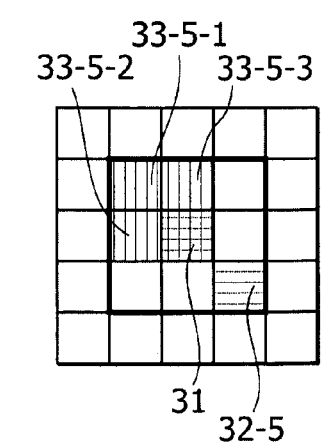

FIG. 3 is a diagram showing an example of a 5×5 pixel array.

In the following embodiments, a pixel 31 is a center pixel or observation pixel in the pixel array unless otherwise specifically noted.

FIG. 4 is a diagram showing legends to be used for explaining the specific pixel detecting process.

A pixel 31 of a lattice pattern is a center pixel (observation pixel). In the following, this pixel is also called a "center pixel (or observation pixel) 31".

A pixel 32 of a horizontal line pattern is a pixel having a minimum luminance difference (minimum luminance difference pixel) from the center pixel 31 among 3×3 pixels having the pixel 31 as the center pixel, and in the following, this pixel is also called a "pixel min1_3×3".

A pixel 33 of a vertical line pattern is a pixel having a minimum luminance among three pixels on the side opposite to the pixel min1_3×3 relative to the center pixel 31, and in the following, this pixel is also called a "pixel min2_3×3".

A pixel 34 of a right upside oblique line pattern is a pixel having a minimum luminance (adjacent minimum pixel) among adjacent pixels one pixel outside the pixel min1_3×3 as viewed from the center pixel 31, and in the following, this pixel is also called a "pixel min1_5×5".

A pixel 35 of a right downside oblique line pattern is a pixel having a minimum luminance (adjacent minimum pixel) among adjacent pixels one pixel outside the pixel min2_3×3 as viewed from the center pixel 31, and in the following, this pixel is also called a "pixel min2_5×5".

At the first step of the specific pixel detecting process, a difference value of a luminance (hereinafter called a "luminance difference value") between the center pixel 31 and 24 pixels other than the center pixel 31 is obtained in the 5×5 pixel array shown in FIG. 3 (refer to FIG. 3).

At the second step, the pixel min1_3×3 having the minimum luminance difference value is detected from eight pixels (in 3×3 pixels indicated by a thick frame) in the periphery of the center pixel 31. As shown in FIGS. 5A to 5H, it can be considered that there are eight candidates of pixels 32-1 to 32-8.

At the third step, the pixel min2_3×3 having the small luminance difference value is detected from three pixels, on the side opposite to (facing), the pixel min1_3×3 detected at the second step, relative to the center pixel 31. As shown in FIGS. 6A to 6H, it can be considered that there are eight candidates for the pixel min2_3×3 relative to the candidates for the pixel min1_3×3 shown in FIGS. 5A to 5H. The eight candidates are generally divided into pixels 33-1-1 to 33-1-3, pixels 33-2-1 to 33-2-3, pixels 33-3-1 to 33-3-3, pixels 33-4-1 to 33-4-3, pixels 33-5-1 to 33-5-3, pixels 33-6-1 to 33-6-3, pixels 33-7-1 to 33-7-3, and pixels 33-8-1 to 33-8-3.

Figure 7A:
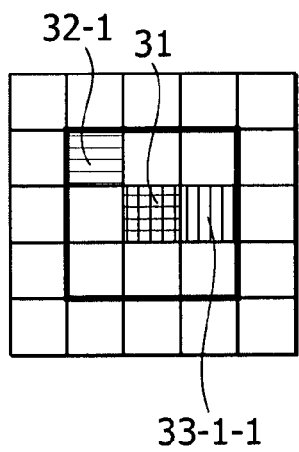
FIGS. 7A to 7C are diagrams showing examples of a candidate for the pixel min2_3×3 relative to a pixel 32-1.
Figure 7B:
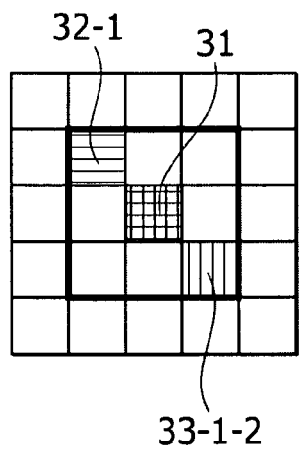
Figure 7C:
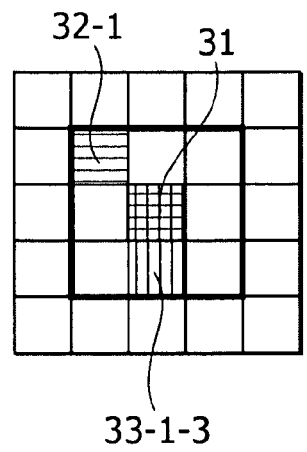

In this example, paying attention to the pixel layout for the pixel 32-1 (refer to FIG. 6A) positioned at the upper left of the center pixel 31, it can be considered that the pixel min2_3×3 detected from this pixel layout has three candidate pixels 33-1-1 to 33-1-3 as shown in FIGS. 7A to 7C.

At the fourth step, the pixel min1_5×5 and pixel min2_5×5 each having the minimum luminance difference value obtained at the first step, are detected from adjacent pixels one pixel outside the pixel min1_3×3 (pixel 32-1) and pixel min2_3×3 (pixel 33-1-1~33-1-3) detected at the second and third steps. In this specification, an adjacent state is a state that not only sides constituting a pixel but also apexes are disposed side by side.

Figure 8A:
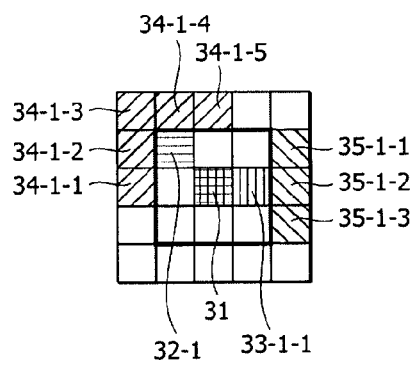
FIGS. 8A to 8C are diagrams showing examples of pixels min1_5×5 and min2_5×5.
Figure 8B:
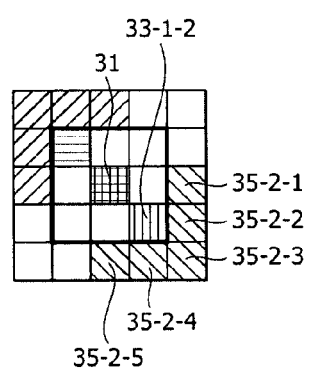
Figure 8C:
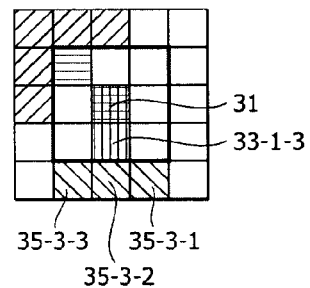

FIGS. 8A to 8C show examples of the pixel min1_5×5 and pixel min2_5×5 relative to the pixel min1_3×3 (pixel 32-1) and pixel min2_3×3 (pixel 33-1-1~33-1-3). In this example, candidates for the pixel min1_5×5 relative to the pixel min1_3×3 (pixel 32-1) are pixels 34-1-1 to 34-1-5, and candidates for the pixel min2_5×5 relative to each of the candidate pixels 33-1-1 to 33-1-3 for the pixel min2_3×3 are pixels 35-1-1 to 35-1-3 (FIG. 8A), pixels 35-2-1 to 35-2-5 (FIG. 8B), and pixels 35-3-1 to 35-3-3 (FIG. 8C), respectively.

As a series of processes of selecting a specific pixel by departing from the center pixel (observation pixel) 31 is continued, it becomes possible to detect edge pixels passing through the center in 5×5 pixels.

Figure 9:
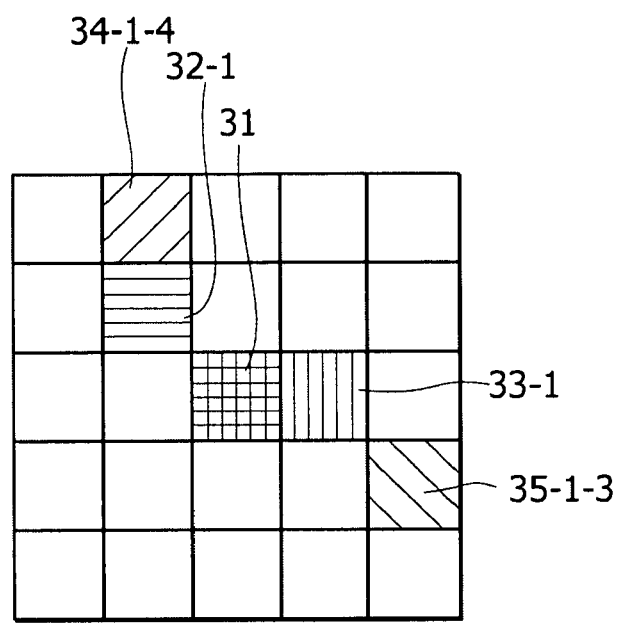
FIG. 9 shows examples of an edge pixel detected by the specific pixel detecting process.

FIG. 9 is a diagram showing examples of an edge pixel detected by the above-described specific pixel detecting process. In this example, detected as edge pixels are pixels 32-1, 33-1, 34-1-4 and 35-1-3 in addition to the center pixel 31.

In the example described above, although specific pixels are detected with respect to 5×5 pixels, specific pixels can be detected also from N×N pixels in the same manner by departing from the center/observation pixel. For example, the specific pixel detecting unit 26 detects from pixels of an N×N array the pixel min1_3×3 (first minimum luminance pixel (1)) and pixel min2_3×3 (first minimum pixel (2)) and up to a pixel min1_N×N (M-th (1) minimum pixel (1) and a pixel min2_N×N (M-th minimum pixel (2)), respectively, where M (natural number) is a quotient obtained by dividing N (natural number) by 2.

<Pixel Interpolating Method>

Next, description will be made on a pixel interpolating method for edge pixels by the pixel interpolating unit 27.

By performing the pixel interpolating process, the detected edge pixels (edge components) can be emphasized more than other pixels. In the following, description will be made on a method of interpolating a center pixel by using 5×5 pixels. Although the case of 5×5 pixels will be described herein, the method is also applicable to N×N pixels (N is a natural number).

First, the five pixels (refer to FIG. 9) of specific pixel components detected by the specific pixel detecting method described above are uniformly weighted, for example, by using the same filter coefficient as that for the observation pixel (center pixel) 31.

On the other hand, for the twenty pixels other than the specific pixel components, in accordance with a luminance difference value between each pixel and the observation pixel obtained when the specific pixels are detected, the filter coefficient is changed (a filter coefficient is set higher if the difference value is small, whereas a filter coefficient is set lower if the difference value is large).

Further, the filter coefficient is also changed in accordance with a distance from the observation pixel (center pixel) 31 (the longer the distance from the observation pixel, the lower the filter coefficient is set).

An interpolating value of the observation pixel 31 is obtained by using pixel data of each pixel and the filter coefficient obtained in the manner described above.

<Examples of Weighting Formula Relative to Luminance Difference Value between Object Pixel and Observation Pixel>

Next, description will be made on the relation between weighting by the pixel interpolating unit 27 and a luminance difference value between the observation pixel and other pixels.

Figure 10A:
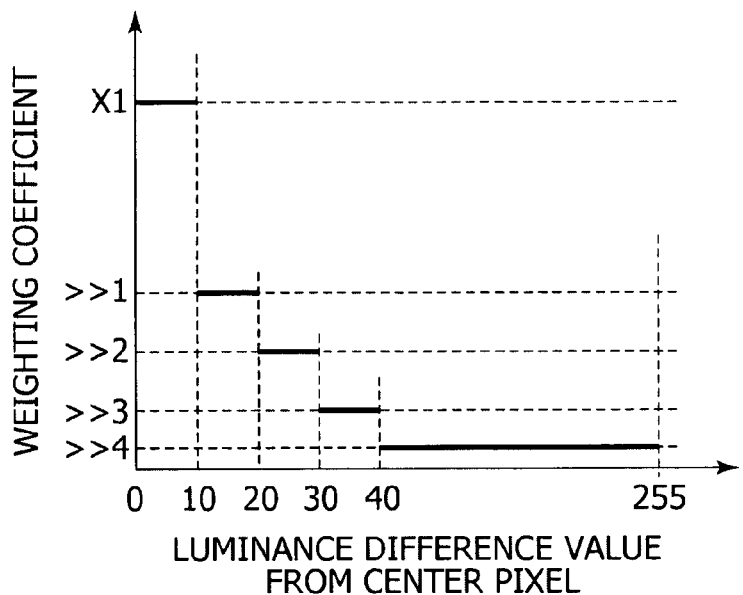
FIGS. 10A and 10B are graphs showing a relation between a luminance difference value from a center pixel and a weighting coefficient for a bit shift method (a) and for a function method (b), respectively.
Figure 10B:
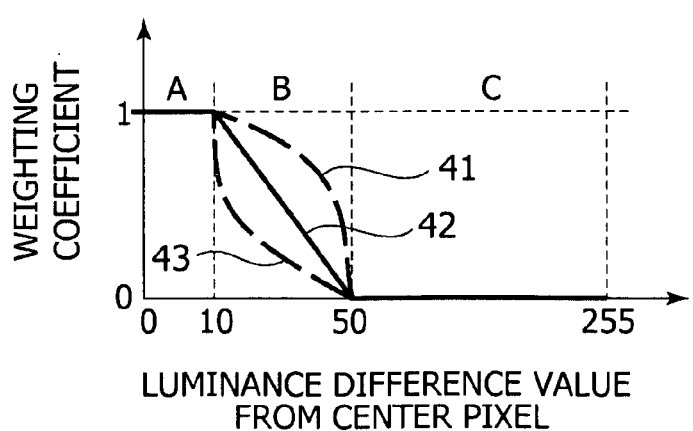

With reference to FIGS. 10A and 10B, description will be made on examples of a method of determining a filter coefficient of the twenty pixels other than the specific pixels. Signal levels corresponding in number to those input to the pixel interpolating unit 27 are set to be 8 bits (0 to 255). In FIGS. 10A and 10B, the abscissa represents a luminance difference value between the observation pixel and another pixel, and the ordinate represents a weighting coefficient (a value to be used for changing a filter coefficient of a filter).

According to a bit shift method shown in FIG. 10A, an area having a small luminance difference value from the observation pixel (e.g., luminance difference values 0 to 10) is multiplied by a weighting coefficient "1" so that filter coefficients are used without being changed. As the luminance difference value becomes larger, bit shifts for the weighting coefficients are made larger from 1→2→3→4 to change the filter coefficients from ½→¼→⅛→1/16. Since the area to be bit-shifted is changed with a luminance difference value from the center pixel, a weighting coefficient suitable for a scene can be given to each filter coefficient of the filter.

According to a function method shown in FIG. 10B, similar to the bit shift method, an A area having a small luminance difference value from the observation pixel (e.g., luminance difference values of 0 to 10) is multiplied by a weighting coefficient "1" so that filter coefficients are used without being changed. For a B area having an intermediate luminance difference value from the observation pixel (e.g., luminance difference values of 10 to 50), the weighting coefficient is changed with a luminance level (from 1 to 0). A C area having a large luminance different value from the observation pixel (e.g., luminance difference values of 50 to 255), is multiplied by a weighting coefficient "0" to set the filter coefficients to "0". For the B area having the intermediate tonal value of a luminance difference value, weighting coefficients suitable for a scene can be set by properly using a formula represented by a straight line 41 or a curve 41 or 42 represented by an exponential function.

<Examples of Weighting Filter Relative to Distance from Center Pixel to Object Pixel>

FIGS. 11A and 11B are diagrams showing filter coefficients before being changed by using a luminance difference value between the observation pixel (center pixel) and the pixel. For example, a weighting filter (1) in FIG. 11A, a Gaussian filter in FIG. 11B or the like may be used having coefficients changed with weighting corresponding to a distance to the center pixel.

<Isolated Point Detecting/Removing Method>

Next, with reference to FIGS. 12A and 12B, an isolated point detecting/removing process will be described. FIG. 12A shows an example of a pixel array containing an isolated point, and FIG. 12B shows an example of a pixel array when the isolated point detecting/removing process is not executed for the isolated point. An isolated point is noise components having small relation to adjacent pixels.

As shown in FIG. 12A, if an isolated point exists at the observation pixel (center pixel) and the isolated point detecting/removing process is not taken into consideration, then as shown in FIG. 12B a filter coefficient value is set only to an area corresponding to detected and unintended edge components and a filter coefficient "0" is set to other areas because of a large luminance difference from the observation pixel. The isolated point cannot therefore be suppressed.

To avoid this, it is judged whether each pixel is an isolated point, by utilizing data of a luminance difference between the observation pixel and each pixel which are used when detecting the edge components.

For example, in a 5×5 pixel array, if the pixel min1_3×3 having the minimum luminance and detected as the edge components among 3×3 pixels has a luminance not smaller than a preset isolating point detecting/removing threshold value (e.g., 100), then the pixel is judged as an isolated point. This isolated point is removed by setting an average of luminance values of twenty five pixels to the isolated point (observation pixel). In this manner, an isolated point can be removed efficiently or erroneous detection of an isolated point can be suppressed.

<On-border Erroneous Interpolation Removing Method>

Next, with reference to FIGS. 13A to 14B, description will be made on a border line detection and an on-border erroneous interpolation removing process.

FIGS. 13A and 13B show examples of pixels to be used for explaining the on-border erroneous interpolation removing process, FIG. 13A shows an example of a border, and FIG. 13B shows an example of a case where the on-border erroneous interpolation removing process is not applied. FIGS. 14A and 14B show examples of images to be used for explaining the on-border erroneous interpolation removing process, FIG. 14A shows an image not applying the on-border erroneous interpolation removing process, and FIG. 14B shows an image applying the on-border erroneous interpolation removing process.

If image data is interpolated by pixels on a border shown in FIG. 13A (the border exists between pixels in white background and pixels of oblique lines) and the on-border erroneous interpolation removing process is not taken into consideration, then pixels are detected as edge components irrespective of different signal levels (e.g., 128 and 16, 64) as shown in FIG. 13B. In this case, pixel storage (memory record) is performed by using data undesired to be used essentially so that the finished image has an irregular border, giving the feeling of strangeness as shown in FIG. 14A.

For example, the image shown in FIG. 14A is in the state that isolated points are detected in a left side portion 51a and a lower side portion 52a on the border between an image portion 50A of the image and another image portion. Because of these isolated points, straight lines in the left side portion 51a and lower side portion 52a on the border of the image portion 50A are not drawn clearly.

To avoid this, it is judged whether an object pixel exists on a border, by utilizing data of a luminance difference between the observation pixel and each pixel which are used when the edge components are detected.

For example, in a 5×5 pixel array, if a luminance difference between the pixel min1_3×3 having the minimum luminance and detected as the edge components among 3×3 pixels and the pixel min2_3×3 detected in correspondence with the pixel min1_3×3 is not smaller than a preset on-border erroneous interpolation removing threshold value, then it is judged that an object pixel exists on the border. The filter coefficients for the pixel min2_3×3 and min2_5×5 are set to "0", and pixel interpolation is performed to remove erroneous interpolation on the border. In this manner, the on-border erroneous interpolation can be removed efficiently.

An image containing an image portion 50B shown in FIG. 14B is an image obtained by photographing the same object as that of the image containing the image portion 50A shown in FIG. 14A. Isolated points are not detected in a left side portion 51b and a lower side portion 52b on the border between the image portion 50B of the image and another image portion. By performing the on-border erroneous interpolation removing process in this manner, an image border will not be erroneously interpolated by erroneously detected isolated points, and the border in an image can be displayed clearly without the feeling of strangeness.

<Operation of Noise Removing Circuit (NR)>

Next, with reference to FIGS. 15 and 16, processes by the noise removing circuit (NR) will be described by using concrete values.

Figure 15:
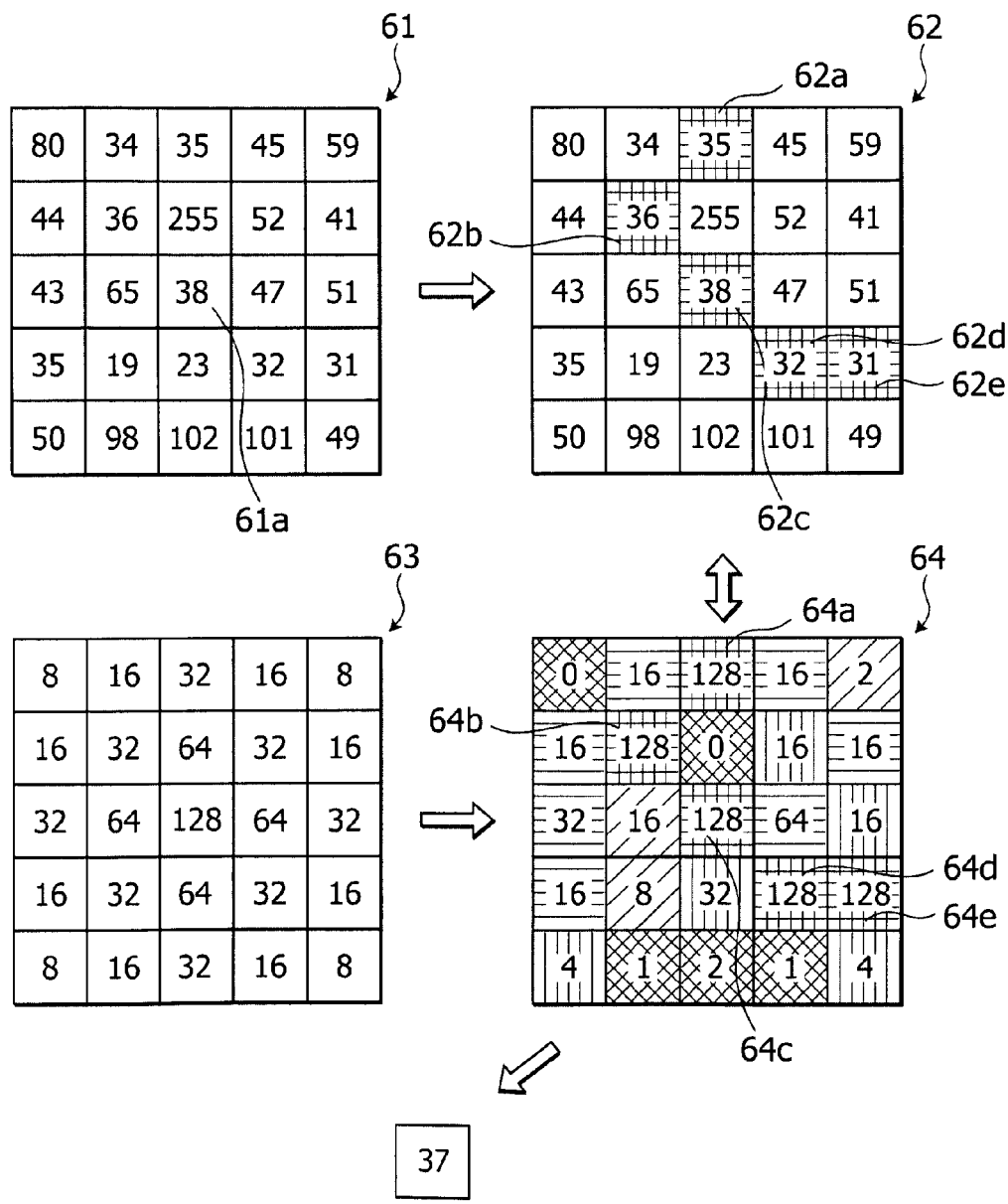
FIG. 15 is a diagram showing a ratio of pixels in each array from the center pixel 0.

A pixel array 61 shown in FIG. 15 shows 5×5 arbitrary pixel information. FIG. 16 is a table showing a list of meanings of pixels in the pixel array shown in FIG. 15. In this table, different weighting coefficients are set in accordance with a luminance difference value between the observation pixel and each of object pixels 71 to 76.

First, at a first stage a luminance difference value between a center pixel (observation pixel) 61a and each nearby pixel in the pixel array 61 shown in FIG. 15 is calculated to obtain a pixel array 62 containing specific pixels 62a to 62e detected in accordance with the calculated difference values. The specific pixel detecting method has been described with reference to FIGS. 3 to 9.

At a second stage, by using the table shown in FIG. 16, filter coefficients of a first weighting filter 63 are weighted in accordance with the luminance difference value between the center pixel 61a and each nearby pixel obtained at the first stage. In this manner, a second weighting filter 64 is generated while considering the specific pixel components (edge components) of the pixel array 62, the luminance difference values from the center pixel 61a, and distance components from the center pixel 61a.

In the second weighting filter 64 as one example of weighting filters, the same filter coefficient (tonal value "128") as that of the center pixel is set as the filter coefficients of specific pixel components 64a to 64e, and other filter coefficients are set to proper values in accordance with the luminance difference values from the center pixel 61a and the distance components from the center pixel 61a.

At a third stage, each pixel of the pixel array 61 is multiplied by applying each filter coefficient of the second weighting filter 64, and the total sum of multiplication results is divided by a total sum of filter coefficients to obtain an interpolated value 37 of the observation pixel (center pixel) 61a.

Next, with reference to flow charts of FIGS. 17 to 19, description will be made on the entirety of processes by the noise removing circuit (NR).

These flow charts show a series of above-described processes of the "specific pixel detecting method", the "pixel interpolating method", the "weighting by the luminance difference value between the observation pixel and an object pixel", the "weighting by a distance from the center pixel to an object pixel", the "isolated point detecting/removing method" and the "on-border erroneous interpolation removing method. In the following example, although description will be made on the processes applied to a 5×5 pixel array, the invention is not limited to this pixel array structure.

At Step S1 shown in FIG. 17, a controller (not shown) of the digital still camera 10 (refer to FIG. 1) judges whether an NR mode of the digital still camera 10 is turned on. If the NR mode is not turned on, the calculation block 25 outputs an image signal supplied from AGC 5 without processing the image signal, to thereafter terminate a series of processes.

If the NR mode is turned on, then at Step S2, NR 6 of the calculation block 25 calculates a luminance difference value between the observation pixel (center pixel) and each of other twenty four pixels in 5×5 pixels.

At Step S3, a pixel min1_3×3 having the minimum luminance difference value obtained by the process at Step 2 is detected from 3×3 pixels constituted of eight pixels adjacent to the observation pixel.

At Step S4, a pixel min2_3×3 having the minimum luminance difference value from the observation pixel is detected from three pixels opposite to the pixel min1_3×3 detected by the process at Step S3, relative to the center pixel.

At Step S5, a pixel min1_5×5 having the minimum luminance difference value from the observation pixel is detected from adjacent pixels one pixel outside the pixel min1_3×3 detected by the process at Step S3. Similarly, a pixel min2_5×5 having the minimum luminance difference value from the observation pixel is detected from adjacent pixels one pixel outside the pixel min2_3×3 detected by the process at Step S4. Five pixels including the observation pixel and the pixels min1_3×3, min2_3×3, min1_5×5 and min2_5×5 detected at the process Steps become the detected specific pixels (edge components). In this manner, the specific pixel detecting process is performed by the processes at Steps S2 to S5.

Next, at Step S6 shown in FIG. 18, it is judged whether the observation pixel is an isolated point. It is judged whether a luminance difference value between the observation pixel and the detected pixel min1_3×3 is not smaller than the isolated point removing threshold value. If true, it is judged as the isolated point and the flow advances to Step S7, whereas if false, it is judged not as the isolated point and the flow advances to Step S8.

If the observation pixel is an isolated point, at Step S7 an average of luminance values of all twenty five pixels is calculated to interpolate the observation pixel. After completion of this pixel interpolation, a series of processes is once terminated, and by using another pixel as the observation pixel, the processes from Step S1 are again executed. The isolated point detecting/removing process is thus performed by the processes at Steps S6 and S7.

On the other hand, at Step S8, filter coefficients of a filter are determined for each of 5×5 pixels.

First, it is judged whether an object pixel is the observation pixel or detected specific pixel (min1_3×3, min2_3×3, min1_5×5, min2_5×5)(edge component). If true, it is judged as edge components and the flow advances to Step S9, whereas if false, it is judged not as edge components and the flow advances to Step S10.

If the judgment process at Step S8 judges as the edge components, then at Step S9 the same filter coefficient as that of the observation pixel is applied to the edge-detected four pixels. Thereafter, the flow advances to Step S19. The pixel interpolation process is thus performed by the processes at Steps S8 and S9.

On the other hand, if the judgment process at Step S8 judges not as edge components, then at Step S10 it is judged whether the luminance difference value between the observation pixel and object pixel obtained by the process at Step S2 is less than a preset threshold value A.

If the judgment result at Step S10 is true, then at Step S11 the filter coefficient held initially is used without any change. Thereafter, the flow advances to Step S21.

If the judgment result at Step S10 is false, then at Step S12 it is judged whether the luminance difference value between the observation pixel and object pixel obtained by the process at Step S2 is in the range between preset threshold values A and B.

If a judgment result at Step S12 is true, then at Step S13 a ½ value of the filter coefficient held initially is used as the filter coefficient. Thereafter, the flow advances to Step S21.

Figure 19:
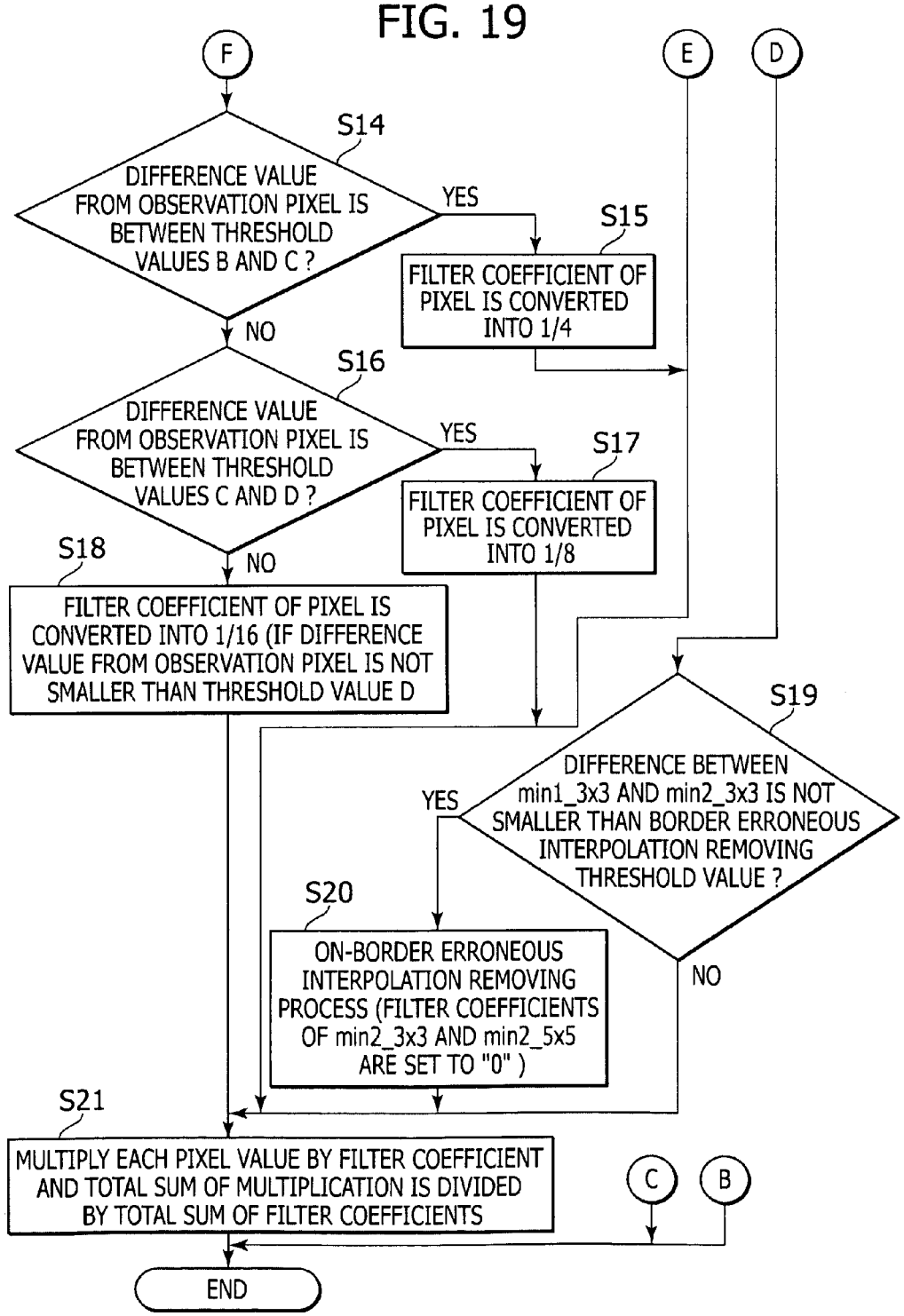
FIG. 19 is a flow chart (3) showing an example of processes by the noise removing circuit (NR)

If the judgment result at Step S12 is false, next at Step S14 shown in FIG. 19, it is judged whether the luminance difference value between the observation pixel and object pixel obtained by the process at Step S2 is in the range between preset threshold values B and C.

If the judgment result at Step S14 is true, then at Step S15, a ¼ value of the filter coefficient held initially is used as the filter coefficient. Thereafter, the flow advances to Step S21.

If the judgment result at Step S15 is false, then at Step S16 it is judged whether the luminance difference value between the observation pixel and object pixel obtained by the process at Step S2 is in the range between preset threshold values C and D.

If the judgment result at Step S16 is true, then at Step S17 a ⅛ value of the filter coefficient held initially is used as the filter coefficient. Thereafter, the flow advances to Step S21.

If the judgment result at Step S16 is false, then the luminance difference value between the observation pixel and object pixel obtained by the process at Step S2 is not smaller than the preset threshold value D, therefore at Step S18 a ¹⁄₁₆ value of the filter coefficient held initially is used as the filter coefficient.

The filter coefficient weighting process for each pixel other than the specific pixels is thus performed by the processes at Steps S10 to S18. In this example, although the filter coefficient is weighted by use of the bit shift method, a weighting method is not limited thereto.

After the process at Step S9 is finished, at Step S19 it is judged whether the position of a pixel to be interpolated exists on a border line.

Specifically, it is judged whether the luminance difference value between the pixels min1_3×3 and min2_3×3 obtained by the processes at Steps S3 and S4 is not smaller than the preset on-border erroneous interpolation removing threshold value. If false, it is assumed that the pixel to be interpolated is not on the border, and the filter coefficient determined at Step S9 is used without any change. Thereafter, the flow advances to Step S21.

If the judgment result at Step S19 is true, then at Step S20 it is judged that the pixel to be interpolated exists on the border, and the filter coefficients of the pixels min2_3×3 and min2_5×5 are set to "0" in order not to perform erroneous interpolation. The on-border erroneous interpolation removing process is thus performed by the processes at Steps S19 and S20.

Lastly, at Step S21, the filter coefficients of twenty five (5×5) pixels obtained by a series of processes are multiplied by corresponding pixel values of 5×5 pixels, and a total sum of multiplication is divided by a total sum of filter coefficients to obtain an interpolated value of one observation pixel.

After the process at Step S21 is finished, a series of processes is once terminated, and the processes from Step S1 are again executed by using another pixel as the observation pixel. The calculation block 25 executes this series of processes for the pixel constituting the frame.

As described above, it is possible to remove noise components from an image scene having a feeling of strangeness caused by levels of signal components and noise components both raised by a process such as gain control by AGC for a low illumination scene. It is therefore possible to judge the object on the image in a low luminance area.

Further, since calculations in a time axis direction are not performed, noises can be removed without causing any feeling of an afterimage of a moving object. It is therefore possible to remove a feeling of an afterimage of the moving object and clear judgment can be made.

Further, since edge components in a predetermined pixel array can be detected automatically, noises can be removed without damaging a feeling of resolution like a Gaussian filter.

Further, the above-described noise removing method does not require complicated calculations including an exponential function like a bilateral filter, but requires only simple calculations such as calculating a luminance difference value from the observation pixel, and a circuit scale can be reduced.

Since edge components can be detected adaptively from luminance difference values from the observation pixel, one hundred and eighty eight edge components can be detected for 5×5 pixels, as compared with eight edge components of a related art direction dependent type filter for 5×5 pixels.

Further, since the shape or direction of an edge to be detected is not only vertical, horizontal and oblique, but also includes a variety of shapes in N×N pixels, this method can be applied effectively also to a scene containing complicated edges (e.g. an object having edges in various directions, such as a design of a melon coat).

Further, since edges can be detected, the method is applicable not only to noise removal but also to an edge emphasizing process.

Further, since the luminance difference value between the observation pixel and an object pixel is calculated in advance, edge components can be detected easily and processed properly even for a scene different from a usual scene and likely to be erroneously detected, such as a scene having an isolated point and a scene that a pixel to be interpolated exists on a border.

Further, since the luminance difference value between the observation pixel and an adjacent pixel and the luminance difference value between the observation pixel and a pixel adjacent to the adjacent pixel of the observation pixel are calculated repetitively to utilize coupling between edges, there is no fear that interpolation is performed by erroneously detecting the noise components or the like as edges.

The order of processes described above with reference to the flow charts is only an example. The order of processes may be exchanged or a plurality of processes may be executed in parallel at the same time, so long as the gist of the present invention is not violated.

In addition to the digital still camera described above, embodiments of the present invention is also applicable to apparatus (e.g., an image generating apparatus, an image recording apparatus, an image displaying apparatus and the like) which calculate a signal level difference value from an observation pixel (center pixel) in the array of N×N pixels, in accordance with a tonal level of a luminance or color value (pixel value) of an image, to automatically and adaptively detect edge components, and filter coefficients are adaptively selected for a pixel of the detected edge components and other pixels to thereby interpolating the observation pixel.

The above-described series of processes may be executed by hardware and also by software. It is needless to say that a function of executing these processes may be realized by a combination of software and hardware. If a series of processes is to be executed by software, the program constituting the software is installed from a program recording medium to a computer having dedicated hardware assembled therein, or, for example, in a general personal computer capable of executing various functions by installing various programs.

Figure 20:
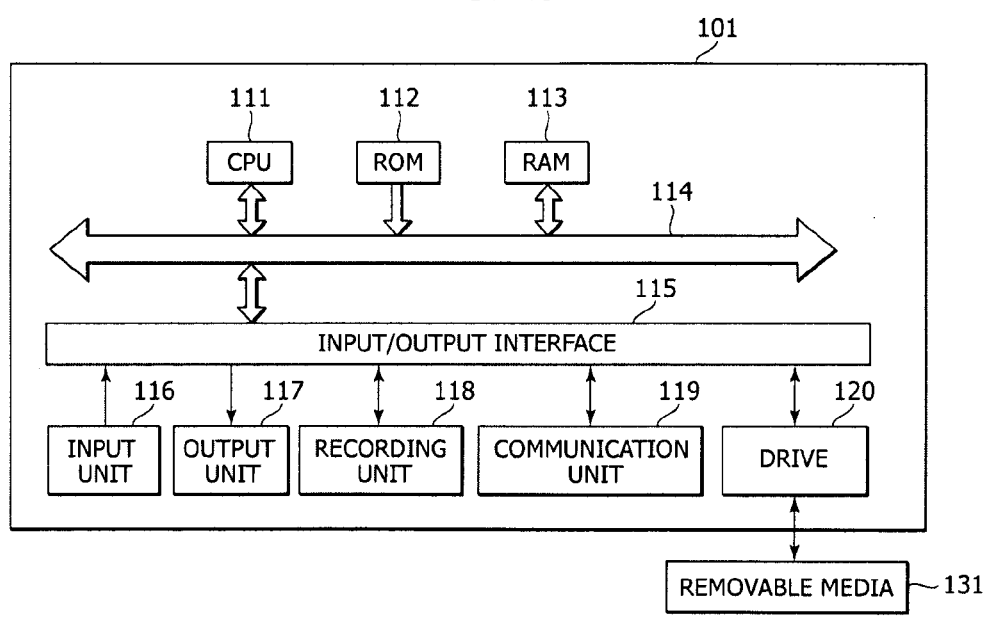
FIG. 20 is a block diagram showing an example of the structure of a general personal computer.

FIG. 20 is a block diagram showing an example of the structure of a computer for executing the above-described series of processes by the program. This computer 101 may be, for example, a dedicated computer of high performance for executing the series of processes, or a general computer having predetermined performance such as a personal computer.

In the computer 101, a central processing unit (CPU) 111 executes in addition to the series of processes, various processes in accordance with a program stored in a read only memory (ROM) 112 or a recording unit 118. A random access memory (RAM) 113 stores programs to be executed by CPU 111, data and the like as appropriate. The CPU 111, ROM 112 and RAM 113 are interconnected by a bus 114.

An input/output interface 115 is also connected to CPU 111 via the bus 114. Connected to the input/output interface 115 are an input unit 116 constituted of a keyboard, a mouse, a microphone and the like, and an output unit 117 constituted of a display, a speaker and the like. CPU 111 executes various processes in response to a command input from the input unit 116, and outputs process results to the output unit 117.

A recording unit 118 connected to the input/output interface 115 is constituted of, e.g., a hard disk, and stores the programs to be executed by CPU 111 and various data.

A communication unit 119 communicates with an external apparatus via a network such as the Internet and a local area network. A program may be acquired via the communication unit 119 and recorded in the recording unit 118.

When a removable medium 131 such as a magnetic disc, an optical disc, a magnetic optical disc and a semiconductor memory is mounted, a drive 120 connected to the input/output interface 115 drives the removable medium to acquire programs, data and the like recorded therein. The acquired programs and data are transferred to the recording unit 118 and recorded therein when necessary.

A program recording medium for storing a program installed in the computer and made executable for the computer is provided as package media by removable media 131 as shown in FIG. 20. The removable media 131 may be a magnetic disk (including a flexible disk), an optical disc (such as a compact disc-read only memory (CD-ROM)), a digital versatile disc (DVD), a magnetic optical disc) and a semiconductor memory. Alternatively, the program recording medium is constituted of ROM 112 for storing (recording) a program temporarily or permanently, a hard disc constituting the recording unit 118 or the like.

A program is stored when necessary in the program recording medium via the communication unit 119 as an interface such as a router and a modem, by utilizing wired or radio transmission media such as a local area network (LAN), the Internet and a digital satellite broadcasting.

In this specification, a process step of writing programs to be stored in the program recording medium includes obviously processes to be time sequentially executed in the written order and processes to be executed in parallel or independently even though process is not performed time sequentially (e.g., a parallel process or a process using an object).

A program may be executed by one computer or may be executed by a plurality of computers in a distributed manner. Further, the program may be executed by being transferred to a remote computer.

Furthermore, the present invention is not limited to the above-described embodiments, but various modifications are possible without departing from the gist of the present invention.

It should be understood by those skilled in the art that various modifications, combinations, sub-combinations and alterations may occur depending on design requirements and other factors insofar as they are within the scope of the appended claims or the equivalents thereof.

The present document contains subject matter related to Japanese Patent Application No. 2007-335079 filed in the Japanese Patent Office on Dec. 26, 2007, the entire content of which being incorporated herein by reference.

What is claimed is:

1. An image processing circuit comprising:
   a plurality of memories for storing line pixels of a frame constituting an image;
   a specific pixel detecting unit for obtaining, for pixels of an arbitrary N×N (N is a natural number) array of the frame of the image sequentially read from the plurality of memories, a luminance difference value which is a difference of luminance between an observation pixel positioned at a center of the array and each of other (N×N−1) pixels, detecting a first minimum pixel (1) having a minimum luminance difference value among a plurality of pixels adjacent to the observation pixel, detecting a first minimum pixel (2) having a minimum luminance difference value from the observation pixel among three pixels opposite to the first minimum pixel (1) relative to the observation pixel, detecting a second minimum pixel (1) having a minimum luminance difference value from the observation pixel among adjacent pixels on a side one pixel outside the first minimum pixel (1), and detecting a second minimum pixel (2) having a minimum luminance difference value from the observation pixel among adjacent pixels on a side one pixel outside the first minimum pixel (2); and
   a pixel interpolating unit for applying filter coefficients having predetermined weights to the observation pixel and specific pixels including the first minimum pixel (1), the first minimum pixel (2), the second minimum pixel (1) and the second minimum pixel (2) which are detected at the specific pixel detecting unit, applying filter coefficients having weights corresponding to the luminance difference value and a distance from the observation pixel to pixels other than the specific pixels in the N×N pixels, obtaining a total sum of results of applying each filter coefficient to each pixel, and dividing the total sum by a total sum of filter coefficients of N×N pixels to obtain an interpolated value for the observation pixel.

2. The image processing circuit according to claim 1, wherein the specific pixel detecting unit detects pixels from the first minimum pixel (1) and the first minimum pixel (2) to an M-th minimum pixel (1) to an M-th minimum pixel (2), where M (a natural number) is a quotient obtained by dividing N by 2, and in a case where the pixel is structured as the N×N.

3. The image processing circuit according to claim 2, wherein the specific pixel detecting unit judges whether a luminance difference value between the observation pixel and the first minimum pixel (1) is not smaller than a predetermined isolated point removing threshold value, and if it is judged as not smaller than the isolated point removing threshold value, calculates an average value of luminance values of all pixels of the N×N pixels to interpolate the observation pixel.

4. The image processing circuit according to claim 3, wherein; the pixel interpolating unit judges whether a luminance difference value between the first minimum pixel (1) and the first minimum pixel (2) is not smaller than a predetermined on-border erroneous interpolation removing threshold value, and if it is judged as not smaller than the on-border erroneous interpolation removing threshold value, sets the filter coefficients for the first minimum pixel (2) and the second minimum pixel (2) to "0".

5. An imaging apparatus comprising:
   an imaging unit for photographing an object and generating an image;
   a plurality of memories for storing line pixels of a frame constituting the image generated by the imaging unit;
   a specific pixel detecting unit for obtaining, for pixels of an arbitrary N×N (N is a natural number) array of the frame of the image sequentially read from the plurality of memories, a luminance difference value which is a difference of luminance between an observation pixel positioned at a center of the array and each of other (N×N−1) pixels, detecting a first minimum pixel (1) having a minimum luminance difference value among a plurality of pixels adjacent to the observation pixel, detecting a first minimum pixel (2) having a minimum luminance difference value from the observation pixel among three pixels opposite to the first minimum pixel (1) relative to the observation pixel, detecting a second minimum pixel (1) having a minimum luminance difference value from the observation pixel among adjacent pixels on a side one pixel outside the first minimum pixel (1), and detecting a second minimum pixel (2) having a minimum luminance difference value from the observation pixel among adjacent pixels on a side one pixel outside the first minimum pixel (2); and
   a pixel interpolating unit for applying filter coefficients having predetermined weights to the observation pixel and specific pixels including the first minimum pixel (1), the first minimum pixel (2), the second minimum pixel (1) and the second minimum pixel (2) which are detected at the specific pixel detecting unit, applying filter coefficients having weights corresponding to the luminance difference value and a distance from the observation pixel to pixels other than the specific pixels in the N×N pixels, obtaining a total sum of results of applying each filter coefficient to each pixel, and dividing the total sum by a total sum of filter coefficients of N×N pixels to obtain an interpolated value for the observation pixel.

6. An image processing method comprising steps of:
   for pixels of an arbitrary N×N (N is a natural number) array of the frame constituting the image, obtaining a luminance difference value which is a difference of luminance between an observation pixel positioned at a center of the array and each of other (N×N−1) pixels;
   detecting a first minimum pixel (1) having a minimum luminance difference value among a plurality of pixels adjacent to the observation pixel;
   detecting a first minimum pixel (2) having a minimum luminance difference value from the observation pixel among three pixels opposite to the first minimum pixel (1) relative to the observation pixel;
   detecting a second minimum pixel (1) having a minimum luminance difference value from the observation pixel among adjacent pixels on a side one pixel outside the first minimum pixel (1);

detecting a second minimum pixel (2) having a minimum luminance difference value from the observation pixel among adjacent pixels on a side one pixel outside the first minimum pixel (2);

applying filter coefficients having predetermined weights to the observation pixel and specific pixels including the first minimum pixel (1), the first minimum pixel (2), the second minimum pixel (1) and the second minimum pixel (2), and applying filter coefficients having weights corresponding to the luminance difference value and a distance from the observation pixel to pixels other than the specific pixels in the N×N pixels; and obtaining a total sum of results of applying each filter coefficient to each pixel, and dividing the total sum by a total sum of filter coefficients of N×N pixels to obtain an interpolated value for the observation pixel.

7. A non-transiitory computer readable medium storing a program for causing a computer to execute image processing comprising steps of for pixels of an arbitrary N×N (N is a natural number) array of the frame constituting the image, obtaining a luminance difference value which is a difference of luminance between an observation pixel positioned at a center of the array and each of other (N×N−1) pixels;

detecting a first minimum pixel (1) having a minimum luminance difference value among a plurality of pixels adjacent to the observation pixel;

detecting a first minimum pixel (2) having a minimum luminance difference value from the observation pixel among three pixels opposite to the first minimum pixel (1) relative to the observation pixel;

detecting a second minimum pixel (1) having a minimum luminance difference value from the observation pixel among adjacent pixels on a side one pixel outside the first minimum pixel (1);

detecting a second minimum pixel (2) having a minimum luminance difference value from the observation pixel among adjacent pixels on a side one pixel outside the first minimum pixel (2);

applying filter coefficients having predetermined weights to the observation pixel and specific pixels including the first minimum pixel (1), the first minimum pixel (2), the second minimum pixel (1) and the second minimum pixel (2), and applying filter coefficients having weights corresponding to the luminance difference value and a distance from the observation pixel to pixels other than the specific pixels in the N×N pixels; and obtaining a total sum of results of applying each filter coefficient to each pixel, and dividing the total sum by a total sum of filter coefficients of N×N pixels to obtain an interpolated value for the observation pixel.

\* \* \* \* \*